US008671169B2

(12) United States Patent
Yao

(10) Patent No.: US 8,671,169 B2
(45) Date of Patent: Mar. 11, 2014

(54) METHOD AND SYSTEM FOR OPENING/BLOCKING SERVICE

(75) Inventor: Ke Yao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 109 days.

(21) Appl. No.: 13/383,844

(22) PCT Filed: Nov. 5, 2009

(86) PCT No.: PCT/CN2009/074824
§ 371 (c)(1),
(2), (4) Date: Jan. 13, 2012

(87) PCT Pub. No.: WO2011/006319
PCT Pub. Date: Jan. 20, 2011

(65) Prior Publication Data
US 2012/0117207 A1   May 10, 2012

(30) Foreign Application Priority Data

Jul. 16, 2009   (CN) .......................... 2009 1 0089386

(51) Int. Cl.
*G06F 15/177* (2006.01)
(52) U.S. Cl.
USPC ............ 709/220; 709/222; 709/223; 370/254
(58) Field of Classification Search
CPC . H04L 41/08; H04L 41/0803; H04L 41/5051; H04L 41/5054; H04L 47/20; H04L 67/32; H04L 67/34
USPC .................. 709/220, 223, 203, 222; 370/254; 706/45, 47; 707/694
See application file for complete search history.

(56) References Cited

U.S. PATENT DOCUMENTS

| | | | |
|---|---|---|---|
| 6,788,649 B1 * | 9/2004 | Dugan et al. .................. | 370/254 |
| 7,251,221 B2 * | 7/2007 | Wall et al. ..................... | 370/254 |
| 7,729,286 B2 * | 6/2010 | Mishra .......................... | 370/254 |
| 2002/0169858 A1 * | 11/2002 | Bellinger et al. ............. | 709/220 |
| 2002/0198973 A1 * | 12/2002 | Besaw .......................... | 709/223 |
| 2005/0203910 A1 * | 9/2005 | Taguchi et al. ................. | 707/10 |
| 2008/0201462 A1 * | 8/2008 | Liss et al. ...................... | 709/223 |
| 2009/0132678 A1 * | 5/2009 | Pelley et al. .................. | 709/217 |
| 2012/0324105 A1 * | 12/2012 | Wall et al. ..................... | 709/224 |

FOREIGN PATENT DOCUMENTS

| | | |
|---|---|---|
| CN | 1402485 A | 3/2003 |
| CN | 101150441 A | 3/2008 |
| CN | 101431698 A | 5/2009 |

OTHER PUBLICATIONS

International Search Report for PCT/CN2009/074824 dated Apr. 14, 2010.

* cited by examiner

*Primary Examiner* — Frantz Jean
(74) *Attorney, Agent, or Firm* — Ling Wu; Stephen Yang; Ling and Yang Intellectual Property

(57) ABSTRACT

A method for activating/deactivating a service is disclosed, and the method includes: when a user creates an end-to-end service, a system saves service related information of the service; when a user chooses to activate or deactivate a service, the system calculates the configuration required in activating or deactivating the service based on the service related information of the service; and the system detects whether the resources related to the service are available based on the configuration required in activating or deactivating the service, and when the resource related to the service are available, the corresponding configuration is packaged and sent to a corresponding network element device for execution. A corresponding system for activating/deactivating a service is also disclosed.

9 Claims, 3 Drawing Sheets

METHOD AND SYSTEM FOR OPENING/BLOCKING SERVICE

TECHNICAL FIELD

The present invention relates to a communication device network management system, and specifically, to a method and a system for automatically activating/deactivating a service in a network management system.

BACKGROUND OF THE RELATED ART

At present, the communication network management system can provide management of end-to-end service for users, including service creation, deletion, and alarm performance information acquisition, and so on. With the unceasingly expansion and deepening of the communication requirement of people, and the scale of the communication network becomes larger and larger, the operating devices included in the network are also more and more, the device networking ways is becoming flexible and complex, the number of the services is also continuously and rapidly increasing, and therefore the requirements for the efficiency of activating services and convenience of maintenance are becoming higher.

Nowadays, the network management used in each region is generally the system directly facing the regional device management—network element management system (EMS), and the activating and deactivating of the service are mainly finished in the EMS. However, since the current EMS performs the management mainly with respect to the network element, it is only able to individually configure the device board and port related to the service one by one during activating and deactivating the service. As a result, on the one hand, the knowledge and management capability on the EMS about the service are decreased, and on the other hand, the activating/deactivating ways of the services configured one by one could not satisfy the operator's requirement for activating and deactivating the service fast due to the complexity of the service networking and the huge number of the services. At the same time, in the case that the service topology is becoming complex, the manually individual configuration may also increase the risk of the occurrence of errors, and the error is difficult to be located and maintained once the error happens.

In view of this, a network management system is needed, and that is able to calculate the configuration required in activating/deactivating a service according to the service related information and the configuration rule of the board and send the configuration to a corresponding device, thereby implementing the function of automatically activating/deactivating the service.

SUMMARY OF THE INVENTION

In view of this, the main object of the present invention is therefore to provide a method and a system for activating/deactivating a service, which is used to solve the technical problem of the huge amount of works for manually activating/deactivating the service one by one, low automation degrees, and being unable to satisfy the requirement of operators under the case that the service network is becoming complex and the amount of services is increasing.

In order to achieve the above object, the technical scheme of the present invention may be implemented by the following ways.

A method for activating/deactivating a service comprises:

when a user creating an end-to-end service, a system saving service related information of the service;

when a user chooses to activate or deactivate a service, the system calculating configuration required in activating or deactivating the service according to service related information of the service; and the system detecting whether a related resource of the service is available or not according to the configuration required in activating or deactivating the service, and when the related resource is available, packaging corresponding configuration to send to a corresponding network element device for execution.

Furthermore, before the step of the user choosing to activate or deactivate the service, the method further comprises: configuring a configuration rule of a board and a conflict detection rule; wherein the configuration rule of the board is used for specifying which configuration should be performed by the board that is passed by the service when activating/deactivating the service; the conflict detection rule is used for specifying a rule for judging whether a resource occupied by a service to be activated conflicts with a resource occupied by other activated services or services to be activated or not when activating/deactivating the service; the service related information at least includes: routing information of the service, a passed board and port, and an activating state of the service.

Furthermore, before the step of calculating the configuration required in activating the service or the step of executing to deactivate the service, the method further comprises: the system detecting whether the information of a device board and port that are passed by the service is complete or not and whether communication is normal or not according to the service related information, and if the information is not complete or the communication is abnormal, prompting the user that a task of activating or deactivating the service cannot be finished; otherwise, the system calculating the configuration required in activating or deactivating the service according to the board configuration rule, conflict detection rule and the service related information.

Furthermore, the step of the system detecting whether the related resource of the service is available or not according to the configuration required in activating or deactivating the service comprises:

detecting whether the service conflicts with the service to be activated or the activated service according to the service related information of the service to be activated and the activated service and the conflict detection rule; if the service conflicts with other services to be activated, the system prompting the user a reason why the conflict is generated and a position of the conflict, and the system supporting to continue to activate the service select at present;

if the service conflicts with the activated service, the system permitting the user to chooses whether to deactivate an old service and activate a new service at a same time.

Furthermore, the method further comprises: the network element device receiving the configuration required in activating or deactivating the service, and then executing an operation of activating or deactivating the service, if execution is successful, the system prompting the user that activating or deactivating the service is successfully, and at meanwhile, modifying a service state in the service related information of the service as an activated state or a deactivated state; if the execution of a corresponding operation fails, the service state keeping unchanged.

Based on the above method, the present invention proposes a system for activating/deactivating a service comprising a network management system and a network element device, wherein the network management system comprises a storage module, a configuration module, a judgment module and a first input and output module; wherein:

the storage module is configured to: save service related information of created services, wherein the service related information at least includes routing information of a service, a board and port that is passed by the service, and an activating state of the service;

the configuration module is configured to: configure a configuration rule of a board and a conflict detection rule when activating/deactivating the service, and calculate configuration required in activating or deactivating the service according to the service related information stored in the storage module when activating or deactivating a service is chosen;

the judgment module is configured to: detect whether a resource related to a service to be activated is available or not according to the configuration required in the activating or deactivating the service output by the configuration module; if the resource is available, send the configuration required in activating or deactivating the service to the first input and output module;

the first input and output module is configured to: send the configuration required in activating or deactivating the service to a network element device, receive execution result information of the network element device, and implement an interface with an external display device.

Furthermore, the configuration module comprises: a rule configuration element, a configuration command calculation element, and a configuration command package element; wherein the rule configuration module is configured to: configure the configuration rule of the board and the conflict detection rule when activating/deactivating the service;

the configuration command calculation element is configured to: calculate the configuration required in activating or deactivating the service according to the service related information;

the configuration command package element is configured to: transform the configuration required in activating or deactivating the service to an available message.

Furthermore, the judgment module further comprises: a resource state judgment element and a resource conflict judgment element; wherein, the resource state judgment element is configured to: detect whether the resource related to completing an operation of activating or deactivating the service is available or not according to the configuration required in the activating or deactivating of the service output by the configuration command calculation element and the service related information; if the resource is available, notify the resource conflict judgment element to perform execution when activating the service, and directly send the configuration required in deactivating the service when deactivating the service;

the resource conflict judgment element is configured to: judge whether the resource related to the service to be activated conflicts with a resource related to a present activated service or not according to the service related information and the conflict detection rule configured by the configuration module, if does not conflict, send the configuration required in activating or deactivating the service to the first input and output module.

Furthermore, the network element device comprises a second input and output module configured to receive the configuration required in activating or deactivating the service sent by the network management system, and to feed back an execution result; wherein the second input and output module sends the configuration required in activating or deactivating the service to a corresponding board for executing an operation of activating or deactivating the service, and if execution of a corresponding operation is successful, feeds back a success message about activating or deactivating the service to the network management system; the network management system modifies a service state in the service related information to an activated state or a deactivated state; and if the execution of the corresponding operation fails, the second input and output module feeds back a failure message about activating or deactivating the service to the network management system, and the service state keeps unchanged.

The present invention simplifies the process of activating/deactivating a service to a certain extent, and since there is not the segment of manually configuring the service resources individually, the accuracy rate of activating/deactivating the service could be increased greatly, and the amount of the work of the maintainers is decreased. Meanwhile, in the case of complex networking and the huge number of services, the function of activating/deactivating multiple services at the same time may be implemented, which greatly improve the efficiency of activating/deactivating the service, thereby saving the time.

PREFERRED EMBODIMENTS OF THE PRESENT INVENTION

The core concept of the present invention is that: the network management system saves the service related information after a user creating the end-to-end service on the network management system by. When needing to activate/deactivate a service, the user configures a configuration rule of the board during activating/deactivating the service firstly, and the network management system could calculate the configuration needed to be sent to the device according to the configuration rule of the board and service related information. If the resources of the board that is passed by the service are complete and the related resources are not occupied by other services, the configuration could be used, thereby completing to automatically activate or deactivate the service. If the resource of the service selected by the user conflicts with the resource occupied by the present activated service or the service to be activated, the system is able to provide the user with a choice of whether to deactivate an old service and activate a new service or not, and the old service is deactivated at the same time when the new service is activated after confirmation by the user.

In order to make the object, technical scheme and advantages clearer and more obvious, embodiments are provided in combination with the drawings to describe the present invention in detail as follows.

Figure 1:
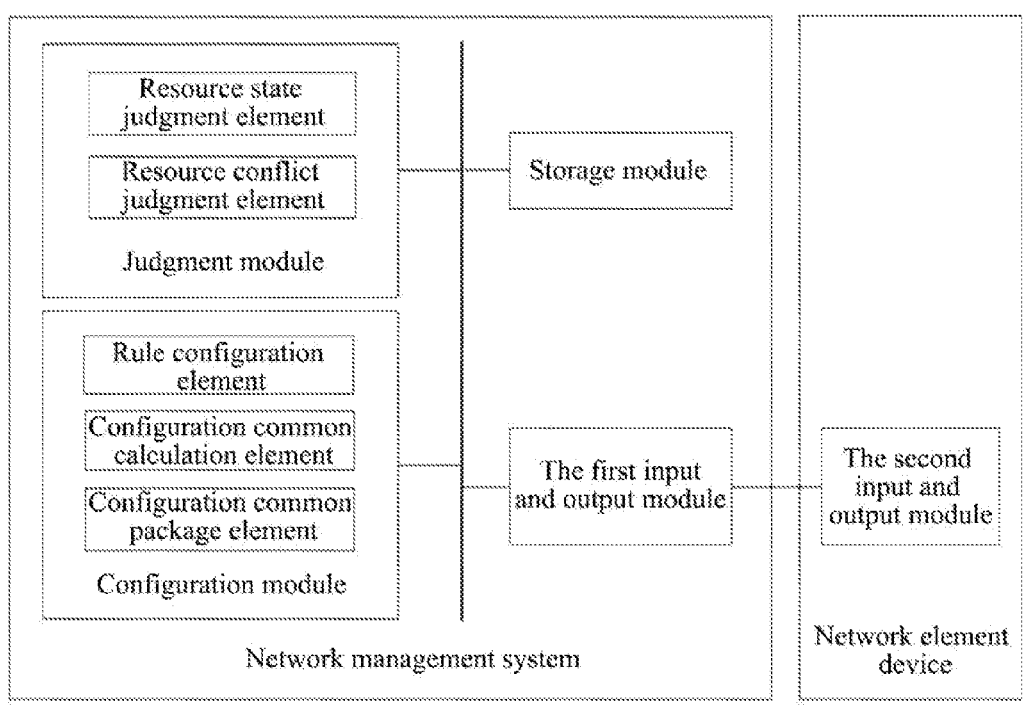
FIG. 1 is a schematic diagram of the structure of the system according to the present invention.

FIG. 1 is a structure diagram of the system of the present invention, and the system mentioned in the present invention comprises a network management system and a network element device. The network management system is configured to: configure and manage to activate or deactivate a service, and the network element device is configured to: execute corresponding activating or deactivating operations according to the command and configuration sent by the network management system.

The network management system further comprises: a storage module, a judgment module, a configuration module, and the first input and output module. The storage module is configured to: save the service related information of the created services. The service related information refers to the attribute information of the service, and the service related information at least includes routing information of the service, a board and a port that are passed by the service, and an activating state of the service.

The configuration module is configured to: calculate the configuration required in activating or deactivating the service according to the service related information stored in the storage module, when choosing to activate or deactivate a service. The configuration module further comprises a configuration command calculation element, a configuration command package element and a rule configuration element, wherein the configuration command calculation element is configured to: calculate the configuration required in activating or deactivating the service according to the service related information; the configuration command package element is configured to: transform the configuration requirement for activating or deactivating the service to an available message. The rule configuration module is configured to: configure a configuration rule of the board and a conflict detection rule during activating/deactivating the service. The judgment module is configured to: detect whether the resource related to the service to be activated is available or not according to the configuration required in the activating or deactivating of the service output by the configuration module; and send the configuration required in activating or deactivating the service to the first input and output module to send to the network element device if it is available. The first input and output module is configured to: send configuration required in activating or deactivating the service to the network element device, receive execution result information of the network element device, and implement an interface with the external display device. The judgment module further comprises a resource state judgment element and a resource conflict judgment element. The resource state judgment element is configured to: achieve the judgment of the present availability of the resource related to the service according to the configuration required in activating or deactivating the service output by the configuration command calculation element and the service related information; if the resource is available, the resource state judgment element notifies the resource conflict judgment element to execute the corresponding function in the scenario of activating the service, and directly sends the configuration required in deactivating the service in the scenario of deactivating the service; the resource conflict judgment element is configured to: judge whether the resource related to the service to be activated conflicts with the resource related to the present activated services or not according to the configuration required in activating the service output by the configuration command calculation element, and if the resources do not conflict, send the configuration required in deactivating the service.

The network element device end comprises the second input and output module configured to: receive the configuration required in activating or deactivating the service sent by the network management system and forward the configuration to the corresponding service board; the service board feeds back the result to the network management system by the second input and output module after execution. If the service is activated or deactivated successfully, the network management system modifies the service state in the service related information of the service as activated or deactivated; if the execution of the corresponding operation fails, the service state keeps unchanged.

Figure 2:
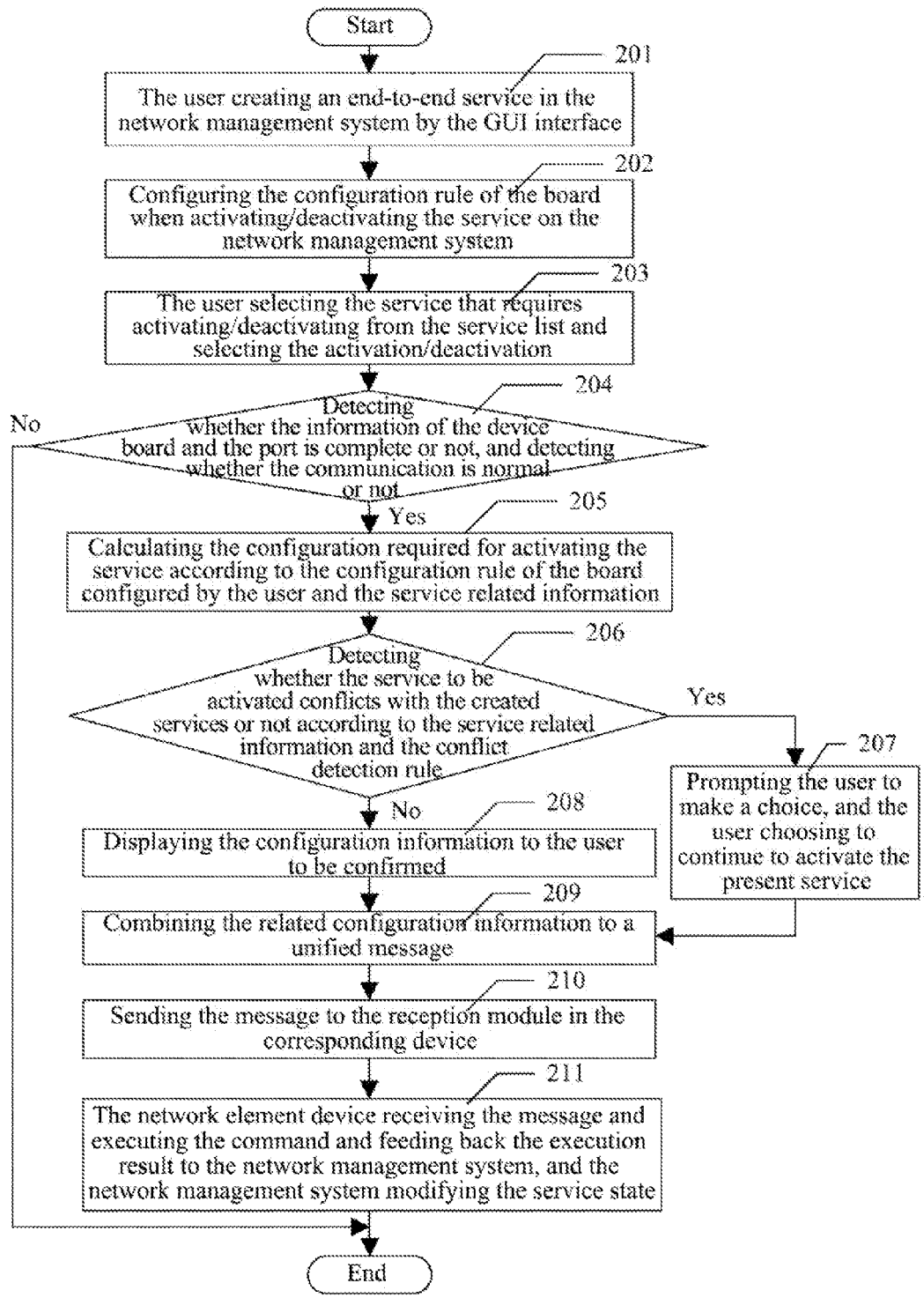
FIG. 2 is a flowchart of activating a service.

FIG. 2 is a flowchart for activating the service, the embodiment of the present invention will be described with reference to FIG. 2, and the procedure of activating the service according to the present invention comprises the following steps.

Step 201, the user creates end-to-end services in the network management system via the GUI interface, the storage module (e.g., the network management data base) saves the service related information of the services, and the service related information includes information such as the routing information of the service, the board and port that are passed by the service, and the activating state and activating time of the service, and so on.

Step 202, the configuration rule of the board when activating/deactivating the service is configured in the network management system.

The configuration rule of the board is used for specifying which configuration should be performed by the board that is passed by the service when activating/deactivating the service; the conflict detection rule is used for judging whether the resource occupied by the service to be activated conflicts with the resources occupied by the other present activated services or the service to be activated or not when activating/deactivating the service.

The configuration rule of the board is given by the network management system by default, and the user may edit and modify this configuration.

Step 203, the user selects the service that requires activating/deactivating from the service list, and choose activation/deactivation, which is equivalent to send an activating/deactivating command.

Step 204, the resource state judgment element in the judgment module first detects whether the information of the board and port of the device that is passed by the service stored in the network management system is complete or not, and detects whether the communication between the network management system and the network element device is normal or not, and if the information is not complete or the communication between the network management system and the network element device is abnormal, the resource state judgment element prompts the user that activating the service cannot be implemented, the procedure ends; or else, step 205 is performed.

Step 205, if the service information is complete and the communication between the network management and the network element device is normal, the configuration command calculation element in the configuration module of the network management system obtains the configuration rule of the board at first, and then reads the service related information in the network management system data base, and calculates the configuration required in activating the service, that is to say the configuration required in the device board that that is passed by the service, according to the configuration rule of the board configured by the user and the service related information.

Step 206, the resource conflict judgment element in the judgment module detects whether the service to be activated conflicts with the created service or not according to the service related information of the created service (including the service to be activated and the activated service) in the data base and the conflict detection rule; if yes, the step 207 is performed; if it not, the step 208 is performed.

Step 207, if the service to be activated conflicts with the created service, the system will prompt the user of the reason why the service conflict is generated and the position of the conflict.

If it conflicts with the service to be activated, the system may permit the user to continue to activate the present selected service. If it conflicts with the activated service, the system may provide the user to choose a function of deactivating the old service at the meantime when activating a new service. If the user does not choose to deactivate the old service, the new service will not be activated; if the user chooses to deactivate the former service at the meantime when activating the new service, the configuration command calculation element will recalculate the configuration required in the device board that is passed by deactivating the old service and activating the new service, and display the configuration to the user for confirmation. If the user decides to activate a new service, step 208 is performed, or otherwise, the user is prompted that activating the service cannot be finished.

Step 208, if the resource of the service to be activated conflicts with the resource of the activated service, the system will display the configuration to the user, and then step 209 is performed after being confirmed by the user.

Step 209, the configuration command package element in the configuration module will combine the related configuration to a unified message.

Step 210, the sending module sends the message from the configuration module to the reception module in the corresponding device according to address information.

Step 211, the reception module in the network element device receives the message and forwards the message to a corresponding device for execution, if the execution of the configuration command is successful, activating the new service is finished; if there is a conflicting service, deactivating the conflicting service will be finished firstly, and then the new service will be activated. After the new service is activated successfully, the system will prompt the user that activating the service is successful, at the meanwhile, the state of new service in the storage module is changed as the activated, and the state of the old conflict service is changed as the deactivated. If the execution of the configuration command fails, the system will prompt the user that activating the service is failed, the state of the new service in the storage module is still the deactivated state, and the state of the old conflicting service is still the activated state.

Figure 3:
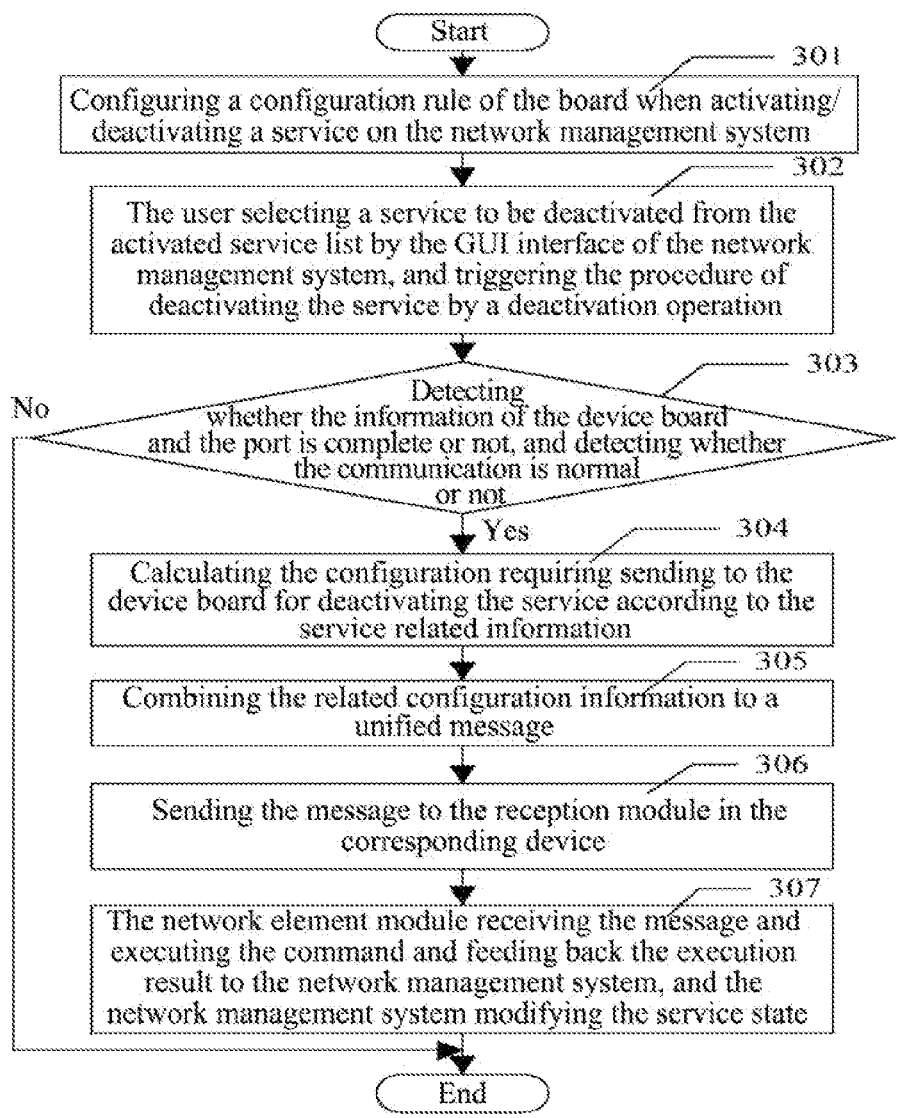
FIG. 3 is a flowchart of deactivating a service.

FIG. 3 is the flowchart of deactivating the service, the embodiments of the present invention will be described with reference to FIG. 3, and deactivating the service according to the present invention comprises the following steps.

Step 301, a configuration rule of the board when activating/deactivating the service is configured in the network management system.

Step 302, the user selects a service to be deactivated from the activated service list via the GUI interface of the network management system, and triggers the procedure of deactivating the service by a deactivation operation.

Step 303, the resource state judgment element in the judgment module firstly detects whether service related information such as the board and the port of the device that is passed by the service to be deactivated and so on in the network management system is complete or not according to the service related information in the network management data base, and detects whether the communication between the network management system and the device is normal or not, and if the service related information is not complete or the communication between the network management and the device is abnormal, the user is prompted that deactivating the service cannot be finished.

Step 304, if the service related information is complete and the communication between the network management and the device is normal, the configuration command calculation element in the configuration module in the network management system firstly obtains the configuration rule of the board, and then reads the service related information in the network management data base, and calculates the configuration needed to be sent to the device board during the deactivating the service according to the service related information, and the system displays the configuration to the user for confirmation at the same time.

Step 305, the configuration command package element in the configuration module will combine the related configuration to a unified message to be sent after the user confirming the configuration.

Step 306, the sending module sends the message from the configuration module to the corresponding reception module according the address information.

Step 307, the reception module receives the configuration, and forwards the configuration to the corresponding device to execute the operation, if the command is executed successfully, deactivating the service is finished, the system will prompt the user that deactivating the service is successful, and at the meanwhile, the service state in the storage module is changed into the deactivated state. If the execution of the command fails, the system will prompt the user that deactivating of the service is failed, and the service state in the storage module is still the activated state.

Figure 4:
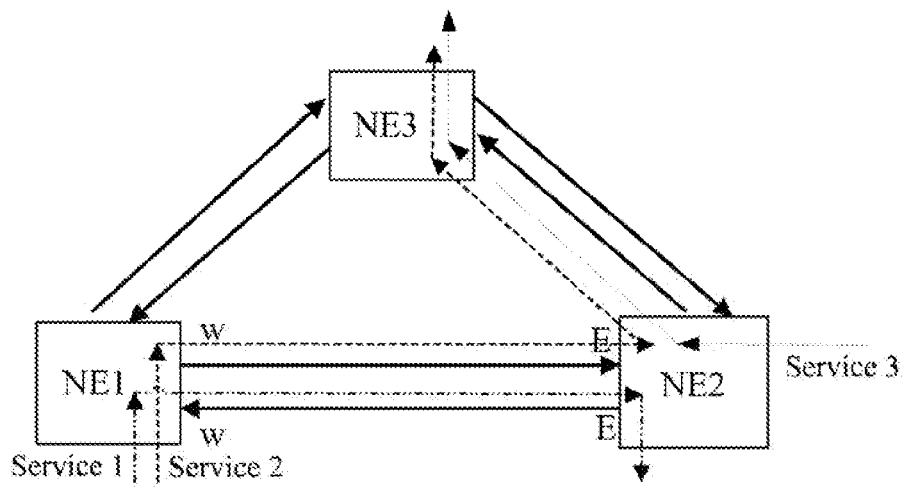
FIG. 4 is a network topology diagram with three nodes in optical communication wavelength division multiplexing (WDM).

The network topology of the optical communication wavelength division multiplexing (WDM) system will be given as an example for describing of the process of activating or deactivating the service according to the present invention. FIG. 4 shows the network topology diagram with three nodes of the WDM system, wherein NE1, NE2, and NE3 are the three WDM devices, service 1 is sent from NE1 to NE2, service 2 is sent from NE1 to NE3 through NE2, and service 3 is sent from NE3 to NE2, wherein the service 1 and service 2 are services to be activated, and the service 3 is an activated service.

The process of activating/deactivating the service of the present invention is as follows.

1) The information related to service 1, service 2, and service 3 is stored in the data base of the network management system, as shown in TABLE 1:

TABLE 1

| Name of service | Access rate | Wavelength information | Detailed information | Routing information | State |
|---|---|---|---|---|---|
| Service 1 | STM-16 | 192.10 | NE1->NE2 | (OTU1->OMD1->OA1)-> (OA2->WSS->OMD2->OTU2) | Deactivated |
| Service 2 | STM-64 | 192.20 | NE1->NE2-> NE3 | (OTU2->OMD1->OA1)-> (WSS)->(OA3->OMD3->OTU3) | Deactivated |

TABLE 1-continued

| Name of service | Access rate | Wavelength information | Detailed information | Routing information | State |
|---|---|---|---|---|---|
| Service 3 | Ge | 192.20 | NE2->NE3 | (OTU->OMD2->WSS)-> (OA3->OMD3->OTU3) | Activated |

It can be seen from TABLE 1 that the service related information includes: routing information, service states, detailed information (information such as the board and port that are passed by the service, and so on), access rates, and wavelength information, and so on.

2) The configuration rule of the board when activating/deactivating the service is configured in the network management system (that is to say, to specify which configuration should be calculated by the system when activating/deactivating the service).

The default configuration rule of the board in the system is as follows:

a, for the service classified board, an access service rate and a state of the laser should be configured;

b, for the wavelength selective switch (WSS) classified board, wavelength assignment should be configured;

c, for the OA classified board, the state of the laser are should be configured;

the user may edit the configuration rule of the board, and when configuration of certain boards is expected configuration and there is no need to repeatedly send the configuration command, the user can choose to not calculate and send the configuration command by configuring the configuration rule of the board.

In this embodiment, for the above-mentioned board, it is assumed that the access rate of the service classified board has been configured and there no need to repeatedly send the command of the access service rate, and then the configuration rule of the board may be edited, and the content of the configuration rule of the board is as follows:

a service classified board: a state of the laser;

a WSS classified board: wavelength assignment;

an OA classified board: a state of the laser;

therefore, the access rate configuration will not be included when the system calculates the configuration command.

3) The user selects service 1 and service 2 to be activated from the service list of the network management system, and performs the activation operation.

4) The network management system will calculate the configuration needed to send to the device board during activating service 1 and service according to the configuration rule of the board:

the configuration needed to send to the device board during activating service 1 is as shown in TABLE 2:

TABLE 2

| Network element | Board | Configuration |
|---|---|---|
| NE1 | OTU1 | Laser: activated |
| NE1 | OA1 | Laser: activated |
| NE2 | WSS | 192.10 wavelength drop |
| NE2 | OA2 | Laser: activated | the configuration needed to send to the device board during activating service 2 is as shown in TABLE 3:

TABLE 3

| Network element | Board | Configuration |
|---|---|---|
| NE1 | OTU2 | Laser: activated |
| NE1 | OA1 | Laser: activated |
| NE2 | WSS | 192.20 wavelength cut-through |
| NE2 | OA3 | Laser: activated |

5) The system needs to judge whether the configuration required in activating service 1 and service 2 conflicts with the configuration of the activated service 3.

It is assumed that the conflict detection rule of the system is as follows:

whether the assignment configuration for WSSs with the same wavelength in different services are inconsistent;

whether the in-port of the service board of the reception end is passed by other wavelength path.

The configuration of the board of service 3 is as shown in TABLE 4:

TABLE 4

| Network element | Board | Configuration |
|---|---|---|
| NE2 | OTU | Laser: activated |
| NE2 | WSS | 192.20 wavelength add |
| NE3 | OA3 | Laser: activated |

The system detects the calculated configuration of service 2 and service 3, and finds that the assignment configuration of the WSS in the two services are inconsistent for the 192.20 wavelength, which complies with the first item in the service conflict detection rules, and therefore it is judged that service 2 and service 3 conflict with each other.

6) The system provides a prompt of the conflict, including the position of the conflict and the reason of the conflict, and provides the user to choose whether to deactivate the service 3 or not.

7) If the user chooses to activate service 1 at the same time when deactivating service 3, the system then calculates the configuration needed to send when deactivating service 3, as shown in TABLE 5:

TABLE 5

| Network element | Board | Configuration |
|---|---|---|
| NE3 | OTU3 | Laser: turned off |

8) The system displays the configuration to be sent to the user for confirmation, then activating service 1 and service 2 is completed and service 3 is deactivated after being applied by the user.

9) in the topology shown in FIG. 4, services 4 to 40 are created and are all sent from NE1 to NE3; the service related information of services 4 to 40 is shown in TABLE 6:

TABLE 6

| Name of service | Access rate | Wavelength information | Detailed information | Routing information | State |
|---|---|---|---|---|---|
| Service 4 | STM-16 | 192.40 | NE1->NE2 | (OTU4->OMD1->OA1)->(OA2->WSS->OMD2->OTU4) | Deactivated |
| . . . | . . . | . . . | . . . | . . . | . . . |
| Service 40 | STM-16 | 196.00 | NE1->NE2 | (OTU40->OMD1->OA1)->(OA2->WSS->OMD2->OTU40) | Deactivated |

10) Services 4 to 40 are selected in the network management system at the same time, and the "activation" is chosen to activate the services.

11) The system may calculate the configuration needed to send to the device board during activating services 4 to 40 at the same time, as shown in TABLE 7:

TABLE 7

| Network element | Board | Configuration |
|---|---|---|
| NE1 | OTU4~OTU40 | Laser: activated |
| NE1 | OA1 | Laser: activated |
| NE2 | WSS | 192.40-196.0 wavelength drop |
| NE2 | OA2 | Laser: activated |

12) The system displays the configuration to be sent of all of the services for confirmation by the user, and then activating multiple services at the same time is finished after being applied.

The above description is only the preferred embodiments of the present invention rather than limiting the protection scope of the present invention.

What is claimed is:

1. A method for activating/deactivating a service, comprising:
    after a user creates an end-to-end service, a system saving service related information of the service;
    configuring a board configuration rule which specifies what configuration is required for the board(s) that is passed by the service when activating/deactivating the end-to-end service;
    when the user chooses to activate or deactivate the end-to-end service, the system calculating configuration required for activating or deactivating the service according to service related information of the service and the board configuration rule; and
    the system detecting whether a related resource of the service is available or not according to the configuration required for activating or deactivating the service, and when the related resource is available, packaging the configuration and send it to a corresponding network element device for execution.

2. The method according to claim 1, before the step of user choosing to activate or deactivate the end-to-end service, further comprising: configuring a conflict detection rule; wherein
    the conflict detection rule specifies a rule for judging whether a resource occupied by a service to be activated conflicts with a resource occupied by other activated services or services to be activated or not when activating/deactivating the service;
    the service related information at least includes: routing information of the service, one or more boards and ports passed by the service, and an activating state of the service.

3. The method according to claim 2, before the step of calculating the configuration required for activating or deactivating the service, further comprising: the system detecting whether the information of a device board and port that are passed by the service is complete or not and whether communication is normal or not according to the service related information, and if the information is not complete or the communication is abnormal, prompting the user that a task of activating or deactivating the service cannot be finished; otherwise, the system calculating the configuration required for activating or deactivating the service according to the board configuration rule, conflict detection rule and the service related information.

4. The method according to claim 2, wherein the step of the system detecting whether the related resource of the service is available or not according to the configuration required for activating or deactivating the service comprises:
    detecting whether the service conflicts with a service to be activated or an activated service according to the service related information of the service to be activated and the activated service and the conflict detection rule; if the service conflicts with another service to be activated, the system prompting the user a reason why the conflict is generated and a position of the conflict, and the system supporting continuing to activate the service currently chosen;
    if the service conflicts with the activated service, the system permitting the user to choose whether to deactivate an old service and activate a new service at the same time.

5. The method according to claim 1, further comprising: the network element device receiving the configuration required for activating or deactivating the service, and then executing an operation of activating or deactivating the service, if execution is successful, the system prompting the user that activating or deactivating the service is successful, and meanwhile, modifying a service state in the service related information of the service as an activated state or a deactivated state; if the execution of a corresponding operation fails, the service state keeping unchanged.

6. A system for activating/deactivating a service, comprising a network management system and one or more network element devices, wherein the network management system comprises a processor, and the processor comprises a storage module, a configuration module, a judgment module and a first input and output module; wherein:
    the storage module is configured to: save service related information of a created end-to-end service, wherein the service related information at least includes routing information of the service, one or more boards and ports that are passed by the service, and an activating state of the service;

the configuration module is configured to: configure a board configuration rule and a conflict detection rule before activating/deactivating the end-to-end service, wherein the board configuration rule specifies what configuration is required for the board(s) that is passed by the service when activating/deactivating the end-to-end service, and calculate configuration required for activating or deactivating the service according to the service related information stored in the storage module and the board configuration rule when activating or deactivating the end-to-end service is chosen;

the judgment module is configured to: detect whether a resource related to the service to be activated is available or not according to the configuration required for the activating or deactivating the service output by the configuration module; if the resource is available, send the configuration required for activating or deactivating the service to the first input and output module;

the first input and output module is configured to: send the configuration required for activating or deactivating the service to a corresponding network element device, receive execution result information of the network element device, and implement an interface with an external display device.

7. The system according to claim 6, wherein the configuration module comprises: a rule configuration element, a configuration command calculation element, and a configuration command package element; wherein the rule configuration module is configured to: configure the board configuration rule and the conflict detection rule before activating/deactivating the service;

the configuration command calculation element is configured to: calculate the configuration required for activating or deactivating the service according to the service related information and the board configuration rule;

the configuration command package element is configured to: transform the configuration required for activating or deactivating the service to an available message.

8. The system according to claim 7, wherein the judgment module further comprises: a resource state judgment element and a resource conflict judgment element;

wherein, the resource state judgment element is configured to: detect whether the resource related to completing the operation of activating or deactivating the service is available or not according to the configuration required for the activating or deactivating of the service output by the configuration command calculation element and the service related information; if the resource is available, notify the resource conflict judgment element to perform execution when activating the service, and directly send the configuration required for deactivating the service when deactivating the service;

the resource conflict judgment element is configured to: judge whether the resource related to the service to be activated conflicts with a resource related to a present activated service or not according to the service related information and the conflict detection rule configured by the configuration module, if does not conflict, send the configuration required for activating or deactivating the service to the first input and output module.

9. The system according to claim 7, wherein the network element device comprises a second input and output module configured to receive the configuration required for activating or deactivating the service sent by the network management system, and to feed back an execution result; wherein the second input and output module sends the configuration required for activating or deactivating the service to a corresponding board for executing the operation of activating or deactivating the service, and if execution of the operation is successful, feeds back a success message about activating or deactivating the service to the network management system; the network management system modifies a service state in the service related information to an activated state or a deactivated state; and if the execution of the operation fails, the second input and output module feeds back a failure message about activating or deactivating the service to the network management system, and the service state keeps unchanged.

* * * * *